United States Patent
Chen et al.

(10) Patent No.: US 9,962,853 B2
(45) Date of Patent: May 8, 2018

(54) AUXILIARY SUPPORT DEVICE FOR CIRCULAR SAW

(71) Applicant: REXON INDUSTRIAL CORP., LTD., Taichung (TW)

(72) Inventors: Jung-Huo Chen, Taichung (TW); Chiung-Fang Chang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days. days.

(21) Appl. No.: 15/153,009

(22) Filed: May 12, 2016

(65) Prior Publication Data

US 2016/0332321 A1 Nov. 17, 2016

(30) Foreign Application Priority Data

May 15, 2015 (TW) .............................. 104115617 A

(51) Int. Cl.
  *B27B 27/08* (2006.01)
  *B23D 47/02* (2006.01)
(52) U.S. Cl.
  CPC ............ *B27B 27/08* (2013.01); *B23D 47/025* (2013.01)

(58) Field of Classification Search
  CPC .............................. B23D 47/025; B27D 27/08
  See application file for complete search history.

(56) References Cited

U.S. PATENT DOCUMENTS

| 5,564,323 A | 10/1996 | Sasaki |
| 2005/0262985 A1 | 12/2005 | Talesky |
| 2013/0160629 A1 | 6/2013 | Feldner |

*Primary Examiner* — Omar Flores Sanchez
(74) *Attorney, Agent, or Firm* — Bacon & Thomas, PLLC

(57) ABSTRACT

An auxiliary support device for circular saw includes a base, a worktable, a support member and a stop member. The base has a supporting portion formed thereon. The worktable is pivotally disposed on the base and is co-planar with the base. The support member is disposed on the supporting portion of the base and is co-planar with the base such that the support member provides support to workpiece of larger size. The base has a mounting hole defined in the supporting portion. The support member has a guiding slot defined therein, a locking member passes through the guiding slot and is secured in the mounting hole for positioning the support member, such that a position of the support member is adjustable relative to the base for adapting to workpieces of various sizes. The stop member is pivotally mounted to one end of the support member adapted for positioning the workpiece.

4 Claims, 5 Drawing Sheets

AUXILIARY SUPPORT DEVICE FOR CIRCULAR SAW

BACKGROUND OF THE INVENTION

1. Field of the Invention

The present invention relates to circular saws, and more particularly to an auxiliary support device for a circular saw.

2. Description of the Related Art

When operating a circular saw for performing a cutting operation, the workpiece is placed on the worktable and placed against the fence for positioning the workpiece to prevent the workpiece from displacement when the cutting operation is performed. In conventional designs as shown in U.S. Pat. No. 5,564,323, US 20130160629, and US 20050262985, an auxiliary supporting device is utilized for adapting to workpieces of various sizes, such that the workpiece is securely positioned when a cutting operation is performed to prevent the workpiece from movement which may consequently effect the cutting stability and accuracy. However, the stability and support provided in the conventional designs are insufficient, and further improvements are required.

SUMMARY OF THE INVENTION

The present invention has been accomplished under the circumstances to overcome the above deficiencies. It is therefore the main object of the present invention to provide an auxiliary support device for a circular saw, which has a simple structure, and provides highly stable support to the workpiece.

To achieve this and other objects of the present invention, an auxiliary support device for a circular saw comprises a base, a worktable, a support member, a locking member, and a stop member. The base has a supporting portion which is formed on a periphery thereof. The supporting portion has a mounting hole defined therein. A first supporting plane is formed on the base. The worktable is pivotally disposed on the base and has a work plane formed thereon. The work plane is substantially co-planar with the first supporting plane for co-operatively supporting a workpiece. The support member is disposed on the supporting portion of the base and has a second supporting plane formed thereon. The second supporting plane is substantially co-planar with the first supporting plane for providing support to workpiece in addition to worktable and base. The second supporting plane has a guiding slot defined therein. The guiding slot correspondingly communicates with the mounting hole of the supporting portion of the base.

A locking member passes through the guiding slot and is secured to the base. When the locking member is loosen, a position of the support member is adjustable for adapting to various sizes of the workpiece. A stop member is pivotally mounted to one end of the support member and is convertible between a retracted position and a usage position. The stop member has a stop wall formed thereon. When the stop member is in the usage position, the stop wall is substantially vertical to the second supporting plane of the support member for properly positioning the workpiece.

The support member has a ramp formed thereon, the ramp is substantially perpendicular relative to an axial direction of the mounting hole. The guiding slot is located in the ramp. The locking member has a bolt head and a threaded bolt engaged to the bolt head. The bolt head abuts against the ramp of the support member. The threaded bolt passes through the guiding slot of the support member and is threadedly secured to the mounting hole of the base such that structural stability of the support member is enhanced.

Other advantages and features of the present invention will be fully understood by reference to the following specification in conjunction with the accompanying drawings, in which like reference signs denote like components of structure.

DETAILED DESCRIPTION OF THE INVENTION

Figure 1:
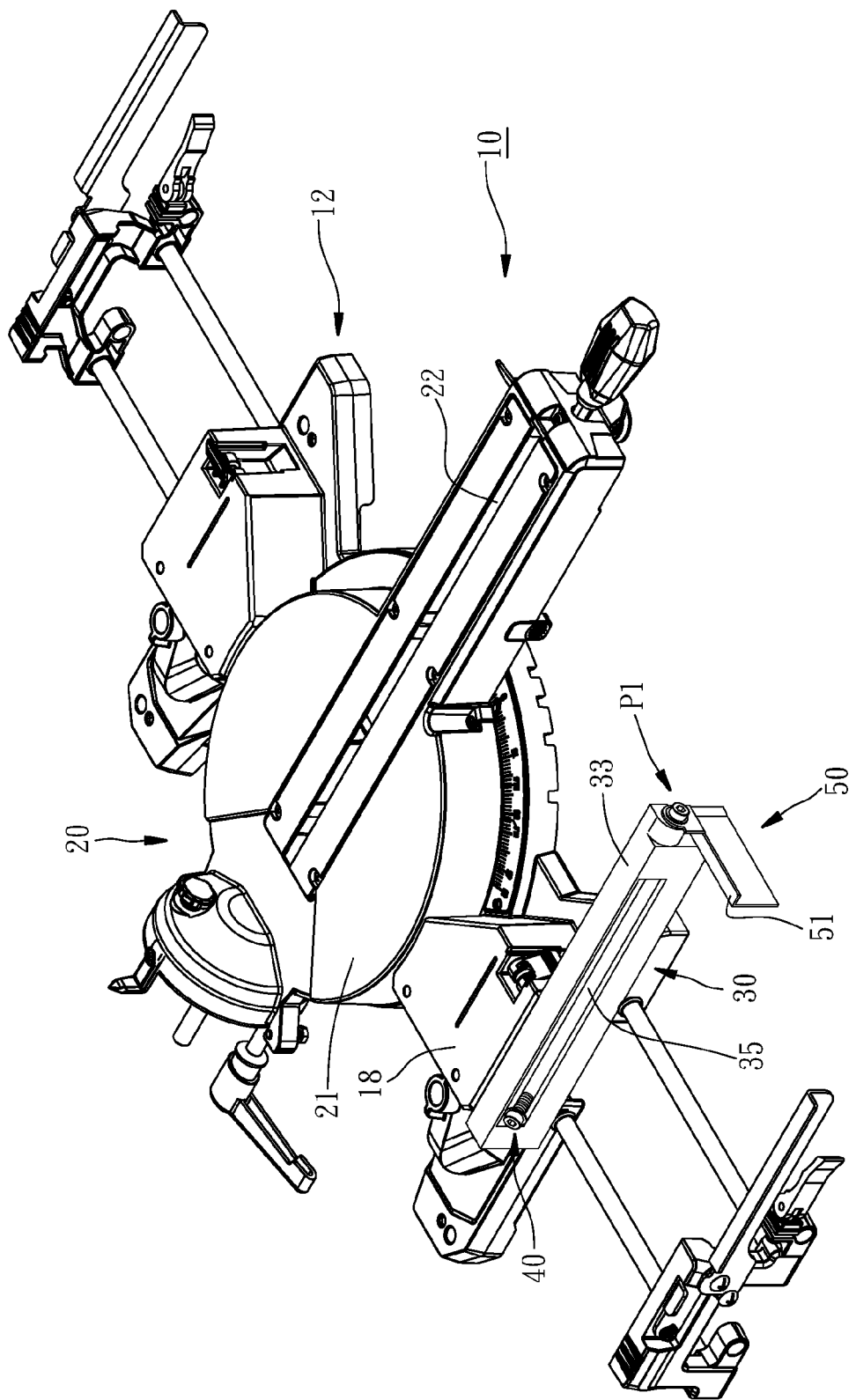
FIG. 1 is a perspective view of the auxiliary support device in accordance with a first embodiment of the present invention, wherein the stop member is in a retracted position.
Figure 2:
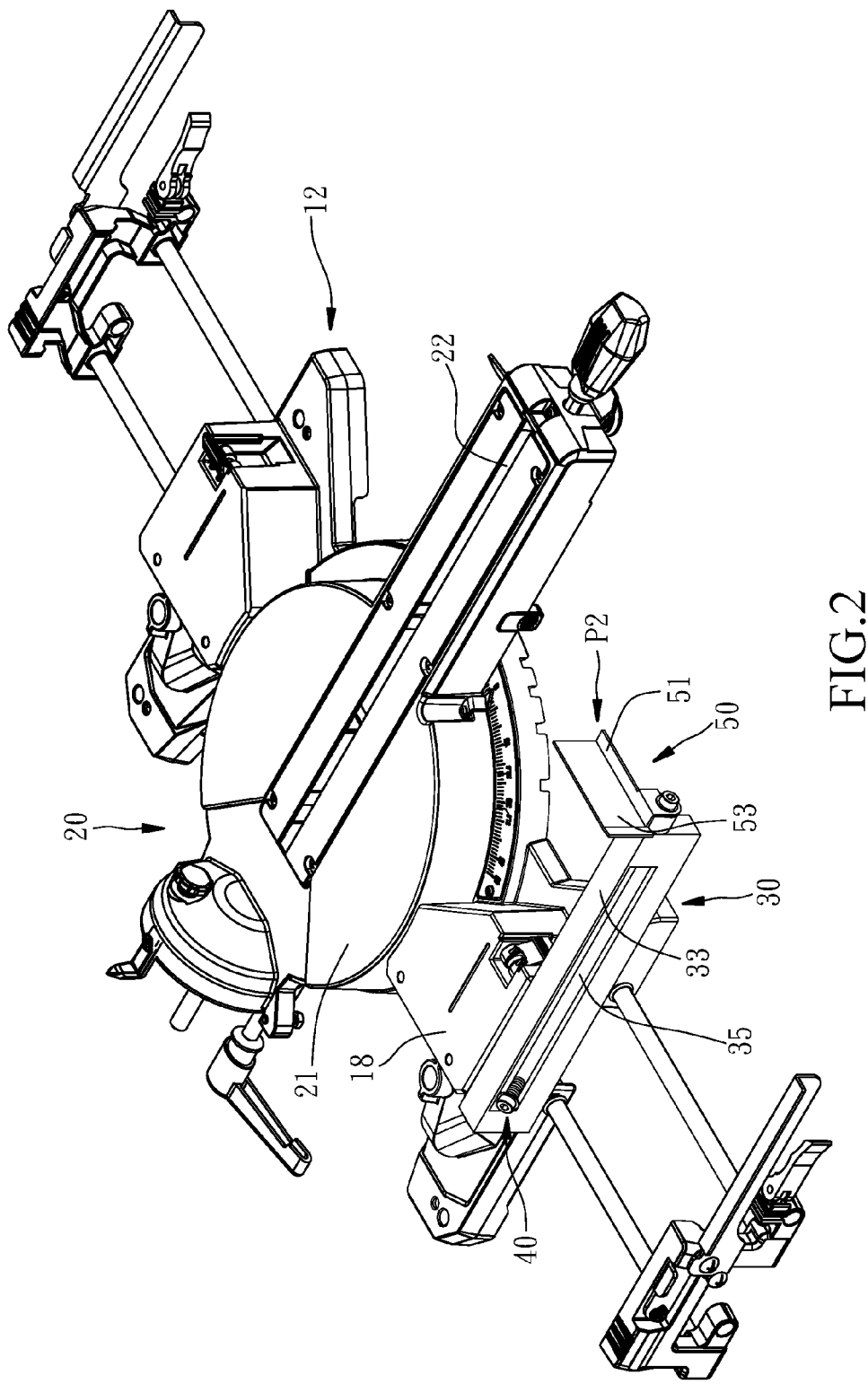
FIG. 2 is a perspective view of the auxiliary support device in accordance with the first embodiment of the present invention, wherein the stop member is in an usage position.

Referring to FIGS. 1 and 2, an auxiliary support device 10 for circular saw in accordance with the present invention comprises a base 12, a worktable 20, a support member 30, a locking member 40, and a stop member 50.

Figure 3:
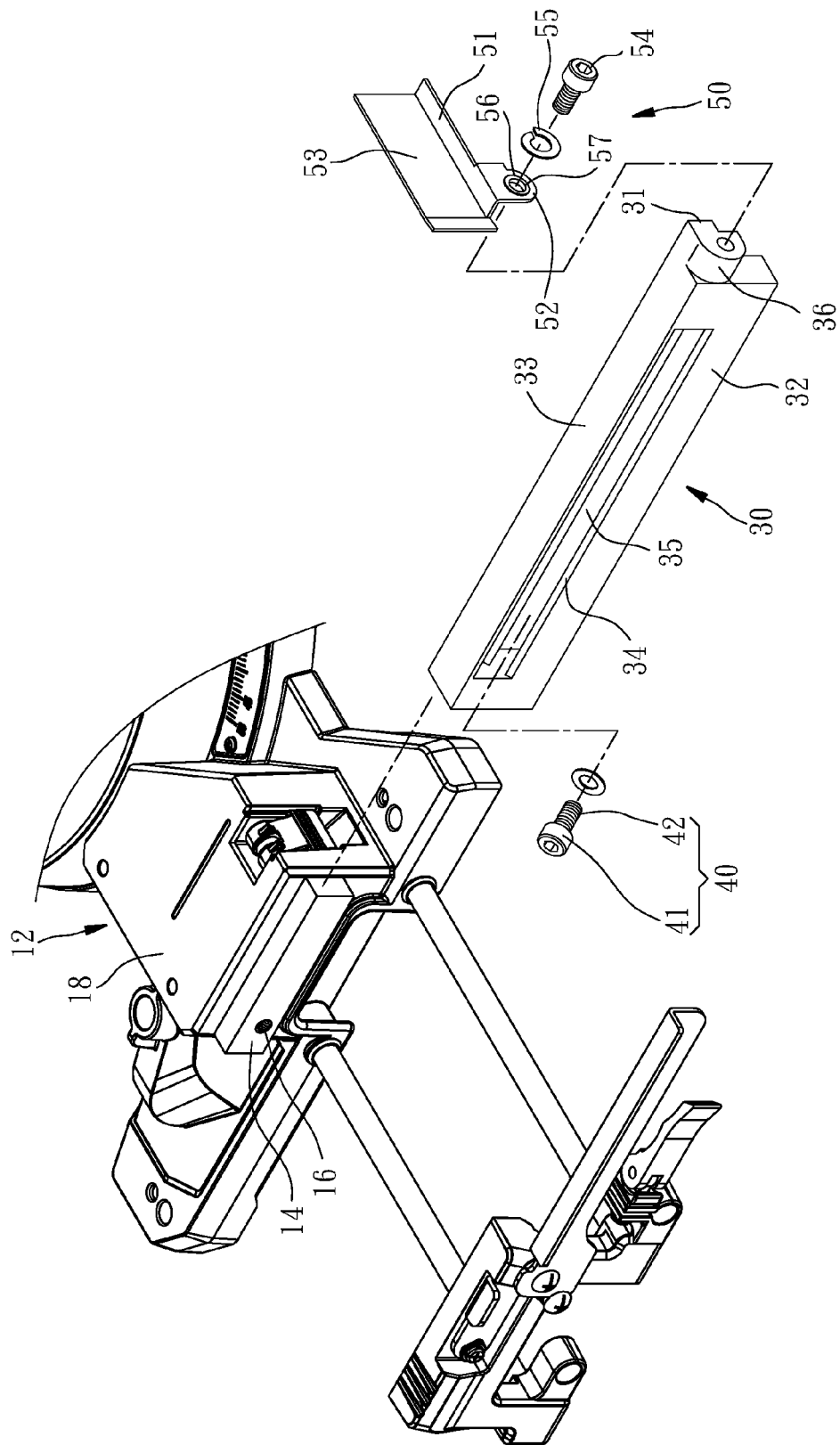
FIG. 3 is an exploded perspective view of the auxiliary support device in accordance with the first embodiment of the present invention.

Referring to FIGS. 2 and 3, the base 12 has a supporting portion 14 formed on a periphery thereof. The supporting portion 14 has a mounting hole 16 defined therein. A first supporting plane 18 is formed on the base 12.

The worktable 20 is pivotally disposed on the base 12, and a work plane 21 is formed thereon adapted for supporting a workpiece (not shown). The work plane 21 and the first supporting plane 18 are substantially co-planar, such that the base 12 co-operates with the worktable 20 to provide auxiliary support to workpieces of various sizes. In addition, the worktable 20 has a recess 22 longitudinally defined therein adapted for receiving a saw blade (not shown) when cutting operation is performed.

The support member 30 has a transverse wall 31 extending therefrom. An upright wall 32 vertically extends from the transverse wall 31. The transverse wall 31 abuts against the supporting portion 14 of the base 12, a second supporting plane 33 is formed on the transverse wall 31. The second supporting plane 33 is substantially co-planar with the first supporting plane 18, such that the support member 30 co-operates with the base 12 and worktable 20 for providing auxiliary support to workpieces of various sizes. The upright wall 32 has a ramp 34 formed thereon, a guiding slot 35 is longitudinally defined in the ramp 34. The ramp 34 is substantially perpendicular relative to an axial direction of the mounting hole 16. A first pivotal portion 36 is formed on one end of the support member 30.

Figure 4:
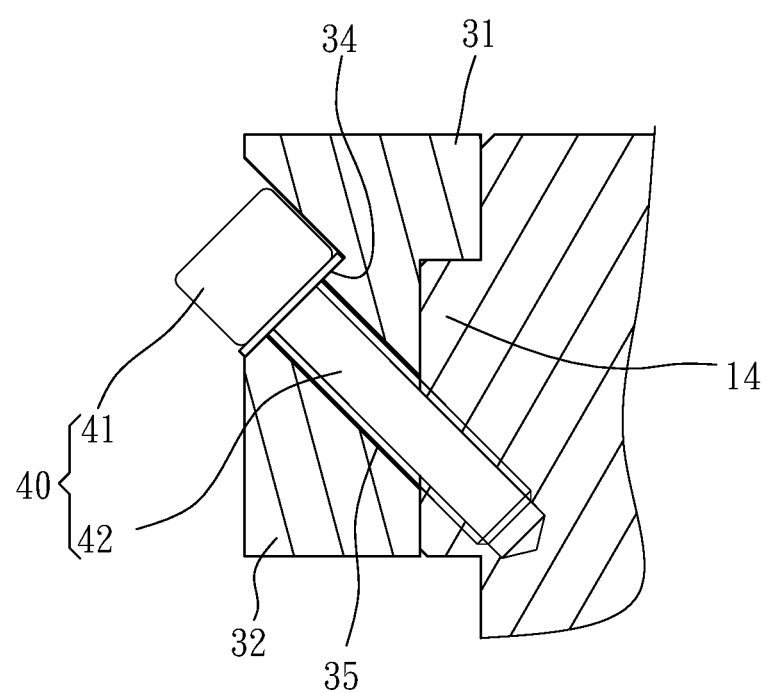
FIG. 4 is a partially sectional view illustrating a structural relationship among the base, supporting member, and the locking member.

Further referring to FIG. 4, the locking member 40 in accordance with the present embodiment is a hexagonal bolt which comprises a bolt head 41 and a threaded bolt 42 engaged to the bolt head 41. The bolt head 41 abuts against the ramp 34 of the support member 30, the threaded bolt 42 passes through the guiding slot 35 and is threadedly secured to the mounting hole 16 of the base 12. Therefore, when the locking member 40 is tightened, the support member 30 is securely positioned to the supporting portion 14 of the base 12, when the locking member 40 is loosen, the support member 30 is slidable relative to the base 12 via the guiding slot 35.

The stop member 50 has a bottom wall 51 formed thereon. A second pivotal portion 52 vertically extends from the bottom wall 51. A stop wall 53 upwardly and vertically extends from the bottom wall 51. The second pivotal portion 52 is mounted to the first pivotal portion 36 via a screw 54 and a lock washer 55 disposed on the screw 54. In addition, the second pivotal portion 52 has an opening 56 defined therein, an inner ring 57 is disposed on the opening 56. The screw 54 slid through the washer 55 and the inner ring 57 such that the stop member 50 is pivotally and smoothly rotatable relative to the support member 30 between a retracted position P1 and a usage position P2. Therefore, when the stop member 50 is arranged in the retracted position P1 as shown in FIG. 1, the bottom wall 51 is located away from the second supporting plane 33 of the support member 30. When the stop member 50 is arranged in the usage position P2, the bottom wall 51 of the stop member 50 abuts against the second supporting plane 33 of the support member 30, and the stop wall 53 is vertically configured relative to the second supporting plane 33 of the support member 30.

When operation is performed, the work plane 21 of the worktable 20, the first supporting plane 18 of the base 12, and the second supporting plane 33 of the support member 30 co-operatively provide support to the workpiece. For workpieces which has a larger size and cannot be sufficiently supported, user may loosen the locking member 40 to adjust the position of the support member 30 adapting to the size of the workpiece; the stop member 50 can be pivotally rotated from its retracted position P1 to its usage position P2 such that the stop wall 53 abuts against the workpiece. Upon adjustment, the locking member 40 is tightened for securing the support member 30 in the desired position which provides sufficient support to the workpiece and the user may then start the cutting operation.

Figure 5:
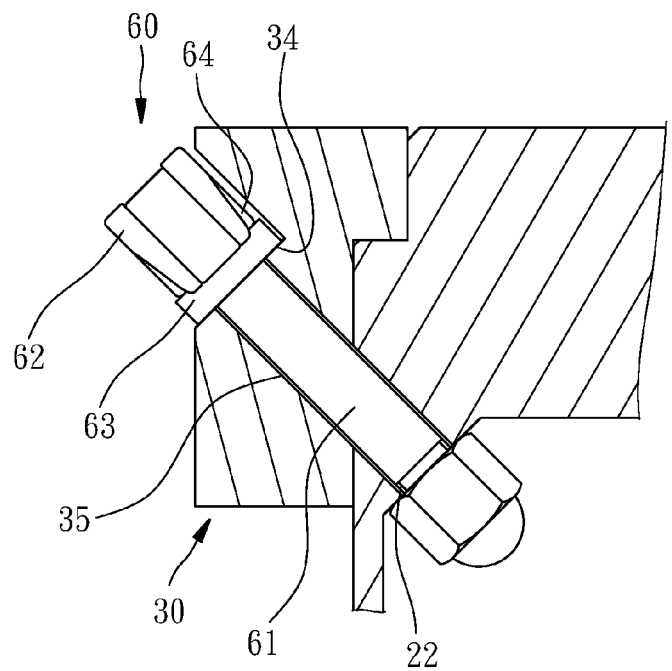
FIG. 5 is a partially sectional view of the auxiliary support device in accordance with a second embodiment of the present invention.
Figure 6:
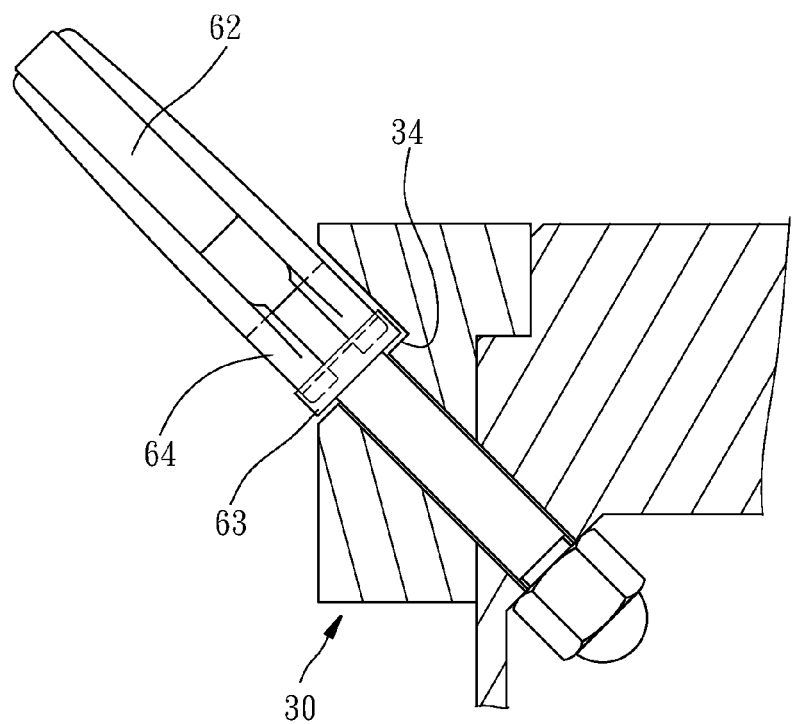
FIG. 6 is a partially sectional view of the auxiliary support device in accordance with the second embodiment of the present invention illustrating a quick release handle in a release position.

Further referring to FIG. 5 and FIG. 6, an auxiliary support device 10 for a circular saw in accordance with a second embodiment of the present invention is shown. This second embodiment is substantially similar to the aforesaid first embodiment except that instead of using a hexagonal bolt for locking member 40, a quick release assembly is used. As shown in FIG. 5 and FIG. 6, the locking member 60 has a threaded bolt 61, a quick release handle 62, and an annular ring 63. The quick release handle 62 has a cam member 64 formed thereon. The threaded bolt 61 passes through the guiding slot 35 of the support member 30, one end of the threaded bolt 61 is threaded to the mounting hole 16 of the supporting portion 14, an opposite end of the threaded bolt 61 is pivotally connected to the cam member 64 of the quick release handle 62. The annular ring 63 is slid on the threaded bolt 61 and is in contact with the cam member 64 of the quick release handle 62. Therefore, when pressing down the quick release handle 62, the cam member 64 abuts against the annular ring 63, the annular ring 63 then securely abuts against the ramp 34 of the support member 30 such that the support member 30 is securely positioned. When lifting the quick release handle 62 in an opposite direction, the cam member 64 releases from abutment with the annular ring 63, the annular ring 63 is then released from abutment with the ramp 34 of the support member 30, such that the support member 30 is loosened, and the position of the support member 30 can be adjusted relative to the base 12.

In view of the above, the auxiliary support device 10 for a circular saw in accordance with the present invention utilizes co-operation between guiding slot 35 of the support member 30 and the locking member 40 for allowing the user to quickly and easily adjust the position of the support member 30 such that in addition to the support of the worktable 20 provides, the support member 30 provides extra auxiliary support to workpiece which has a larger size, such that workpieces of various sizes are sufficiently supported. Furthermore, the co-operation between the ramp 34 of the support member 30 and the locking member 40 provides stability in structure for enhancing stability and accuracy when cutting operation is performed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An auxiliary support device for a circular saw comprising:
   a base having a supporting portion formed on a periphery thereof, a first supporting plane formed on a surface of the base;
   a worktable pivotally disposed on the base, the worktable having a work plane formed thereon, the work plane being substantially co-planar with the first supporting plane;
   a support member disposed on the supporting portion of the base, the support member having a second supporting plane formed thereon, the second supporting plane having a guiding slot defined therein, the second supporting plane being substantially co-planar with the first supporting plane;
   a locking member passing through the guiding slot and secured to the base; and
   a stop member pivotally mounted to one end of the support member and convertible between a retracted position and an usage position, the stop member having a stop wall formed thereon;
   wherein when the stop member is in the usage position, the stop wall is substantially vertical above the second supporting plane of the support member.

2. The auxiliary support device for circular saw as claimed in claim 1, wherein the supporting portion has a mounting hole defined therein, the locking member passes through the guiding slot and secured to the mounting hole of the base.

3. An auxiliary support device for a circular saw comprising:
   a base having a supporting portion formed on a periphery thereof, a first supporting plane formed on a surface of the base;
   a worktable pivotally disposed on the base, the worktable having a work plane formed thereon, the work plane being substantially co-planar with the first supporting plane;

a support member disposed on the supporting portion of the base, the support member having a second supporting plane formed thereon, the second supporting plane having a guiding slot defined therein, the second supporting plane being substantially co-planar with the first supporting plane;

a locking member passing through the guiding slot and secured to the base; and a stop member pivotally mounted to one end of the support member and convertible between a retracted position and an usage position, the stop member having a stop wall formed thereon;

wherein when the stop member is in the usage position, the stop wall is substantially vertical above the second supporting plane of the support member; and the supporting portion has a mounting hole defined therein, the locking member passes through the guiding slot and secured to the mounting hole of the base; and wherein the support member has a ramp formed thereon, the ramp being substantially perpendicular relative to an axial direction of the mounting hole, the guiding slot located in the ramp; the locking member having a bolt head and a threaded bolt engaged to the bolt head, the bolt head abutting against the ramp of the support member, the threaded bolt passing through the guiding slot of the support member and threadedly secured to the mounting hole of the base.

4. An auxiliary support device for a circular saw comprising:

a base having a supporting portion formed on a periphery thereof, a first supporting plane formed on a surface of the base;

a worktable pivotally disposed on the base, the worktable having a work plane formed thereon, the work plane being substantially co-planar with the first supporting plane;

a support member disposed on the supporting portion of the base, the support member having a second supporting plane formed thereon, the second supporting plane having a guiding slot defined therein, the second supporting plane being substantially co-planar with the first supporting plane;

a locking member passing through the guiding slot and secured to the base;

a stop member pivotally mounted to one end of the support member and convertible between a retracted position and an usage position, the stop member having a stop wall formed thereon; and when the stop member is in the usage position, the stop wall is substantially vertical above the second supporting plane of the support member; and wherein the stop member has a bottom wall vertically extends from the stop wall; wherein when the stop member is arranged in the retracted position, the bottom wall is located away from the second supporting plane of the support member; when the stop member is arranged in the usage position, the bottom wall abuts against the second supporting plane of the support member.

* * * * *